United States Patent
Frase et al.

(10) Patent No.: US 6,695,421 B1
(45) Date of Patent: Feb. 24, 2004

(54) METHOD FOR ASSEMBLING A STRONGBOX AND FOR COATING AN EQUIPPED AND CONNECTED FRAMEWORK AND KIT FOR CARRYING OUT SAID METHOD

(75) Inventors: Hans-Jürgen Frase, Niederdreisbach (DE); Torsten Weller, Weitefeld (DE)

(73) Assignee: Otto Lampertz GmbH & Co. KG, Wallmenroth (DE)

( * ) Notice: Subject to any disclaimer, the term of this patent is extended or adjusted under 35 U.S.C. 154(b) by 0 days.

(21) Appl. No.: 09/857,360
(22) PCT Filed: May 21, 1999
(86) PCT No.: PCT/EP99/03510
§ 371 (c)(1), (2), (4) Date: Sep. 4, 2001
(87) PCT Pub. No.: WO00/34613
PCT Pub. Date: Jun. 15, 2000

(30) Foreign Application Priority Data

Dec. 4, 1998  (DE) .......................................... 198 55 931

(51) Int. Cl.⁷ .............................................. A47B 81/00
(52) U.S. Cl. ................................... 312/409; 312/265.4
(58) Field of Search ........................... 312/265.1, 265.2, 312/265.3, 265.4, 265.5, 400, 406, 406.2, 409, 257.1, 263

(56) References Cited

U.S. PATENT DOCUMENTS

| | | | | | |
|---|---|---|---|---|---|
| 2,741,341 A | * | 4/1956 | Anderson | ................ | 312/406.2 |
| 3,307,894 A | * | 3/1967 | Collier | .................... | 312/265.2 |
| 3,563,627 A | * | 2/1971 | Whipps | .................... | 312/265.2 |
| 4,099,355 A | * | 7/1978 | Strunk | ........................ | 52/404.3 |
| 4,176,013 A | * | 11/1979 | Garthus et al. | ............. | 202/242 |
| 4,441,766 A | * | 4/1984 | Hess | .......................... | 312/400 |
| 4,559,881 A | | 12/1985 | Lankard et al. | | |
| 4,744,186 A | | 5/1988 | Smith et al. | | |
| 6,036,290 A | * | 3/2000 | Jancsek et al. | .......... | 312/265.4 |
| 6,089,393 A | * | 7/2000 | Revelli et al. | ............. | 220/4.31 |

FOREIGN PATENT DOCUMENTS

| | | | | |
|---|---|---|---|---|
| DE | 1 227 625 | 10/1966 | | |
| DE | 37 18 911 | 12/1988 | | |
| DE | 296 05 183 | 5/1996 | | |
| EP | 560 191 | 9/1993 | | |
| FR | 2 678 672 | 1/1993 | | |
| JP | 6-90089 | * | 3/1994 | .............. 312/257.1 |
| WO | 99/11537 | * | 3/1999 | |

* cited by examiner

Primary Examiner—Janet M. Wilkens
(74) Attorney, Agent, or Firm—Pauley Petersen & Erickson

(57) ABSTRACT

A method for assembling a strongbox and for subsequently coating an equipped and connected framework with coating elements and at least one door. The coating is in the form of a bottom element and frame elements at the front end and/or the rear end of the framework and lateral elements and an upper element. The coating accommodates the framework depending on the type of protection required. According to this invention, the elements are interlinked by simple joining elements. It is also possible to juxtapose several partial boxes to provide an aggregate box.

20 Claims, 2 Drawing Sheets

METHOD FOR ASSEMBLING A STRONGBOX AND FOR COATING AN EQUIPPED AND CONNECTED FRAMEWORK AND KIT FOR CARRYING OUT SAID METHOD

BACKGROUND OF THE INVENTION

1. Field of the Invention

This invention relates to a method for constructing a secure cabinet, and for subsequently paneling an equipped and connected rack structure with paneling elements and at least one door, as well as to a kit for executing the method.

2. Description of Related Art

It quite often occurs that, because of changing operating conditions or uses, already assembled and ready-to-operate rack structures need to be protected to a greater or lesser extent. Some examples are protection against dust, splashing water, noise and fire, which require the subsequent paneling of the rack structure.

SUMMARY OF THE INVENTION

It is one object of this invention to provide a method for constructing a secure cabinet, and in particular a subsequent paneling of a ready-to-operate rack structure, which can be performed easily and without interfering with the rack structure.

This object is attained in accordance with this invention with a rack structure that is raised by at least the thickness of a bottom element. The rack structure is placed and positioned on the bottom element positioned below. A front grooved element with connecting elements for a door element is placed on the bottom element in the area of the front of the rack element and is there connected. The front grooved element is connected with side elements placed on the bottom element. A rear grooved element or a rear wall element is placed on the bottom element in the area of the back of the rack structure and is connected with the two side elements. A top element is placed on the grooved elements, the side elements and possibly the rear wall element and is connected with the grooved elements and/or with the side elements.

With a lifting element, the rack structure can be raised to the height required for sliding the bottom element underneath it without releasing the connector cables. Once the bottom element has been slid underneath it, the rack element is put down and positioned in such a way that it projects on all sides from the rack element sufficiently far, so that the elements provided for paneling can be placed on the bottom element and connected with it, if desired.

If no rack element is provided, the secure cabinet can also be constructed without resorting to the first two steps in order to arrange built-in units in the cabinet later.

A front and a rear grooved element are used if the front and the rear of the paneled rack structure are accessible. If access is required only from the front, the back is paneled with a rear wall element and/or has an air conditioner. The connection of the elements with each other is performed at predetermined places, which are aligned with each other, of the horizontally and/or vertically abutting front faces of the elements, wherein the number of the connection points between two elements can be two or more in order to achieve sufficient support.

It is also possible to line up several grooved elements on the front and rear wall elements in order to construct a lined-up cabinet arrangement, wherein the intervening side walls are omitted, and several bottom elements or one common bottom element can be employed.

In accordance with a preferred embodiment of this invention, the front and the rear grooved elements are assembled from vertical and horizontal frame legs in the form of a frame. In this case it is possible to reduce the required elements so that the front and rear grooved elements are identically embodied.

In another embodiment used for the same purpose, the bottom element and the top element are identically embodied.

A simple assembly of the paneling, which can be quickly performed, is achieved because known turning bar closures are used for connecting the elements, whose closure elements are matched to each other, and are installed in the elements at abutting faces of connecting points aligned with each other. Such hook closures are commercially available, wherein the two closure elements can be installed in the abutting front faces of the elements. The hook can be rotatably seated in one closure element and can be inserted into the other sleeve-like closure element. After being inserted, the hook is turned on top of a clamping bolt and is appropriately clamped during an additional eccentric displacement, so that the elements connected with each other are pulled toward each other under tension. Thus, the elements need only have one access opening to the rotary bearing of the hook, so that the hook can be turned in the associated closure part.

So that uniform connecting elements can be used at all connecting points, a further embodiment provides that the vertical frame legs of the grooved elements are designed L-shaped in cross section and have connecting faces for the vertical side elements.

In accordance with a preferred embodiment, the structure of the elements is designed so that the elements are embodied to be double-walled and are filled with insulating material.

Thus it is possible to advantageously provide an insulating material having sound protection and/or fire protection properties, which is enclosed in sheet metal walls.

In order to seal the joints between the elements in a fireproof manner, in one embodiment the joints between the elements are sealed by highly temperature-resistant sealing elements, which expand in the event of fire.

The attachment of the doors can easily be achieved because the front and the rear grooved elements are closed off by door elements, wherein the vertical frame legs of the grooved elements and the door elements have hinge and closure elements at points matching each other.

A kit for executing the method in accordance with the invention includes:

a) panel-shaped structural elements, side elements and top elements;

b) frame-like front grooved elements; and c) frame-like rear grooved elements or panel-shaped rear wall elements;

all of which are connected by complementary connecting elements at the abutting horizontal and/or vertical front faces at connecting points, which are aligned with each other, and can thus be connected.

To reduce the number of different required elements, the bottom elements and the top elements, as well as the front and rear grooved elements, are each identically embodied.

For compartmentizing the secure cabinet, horizontal frame legs are provided at least partially with fireproof and gas-tight cable bulkhead elements.

The interior can be easily enlarged because several grooved elements, or rear wall elements, are sealingly connected with each other, while omitting the side elements.

BRIEF DESCRIPTION OF THE DRAWINGS

This invention is explained in greater detail in view of exemplary embodiments shown in the drawings, wherein.

DESCRIPTION OF PREFERRED EMBODIMENTS

Figure 1:
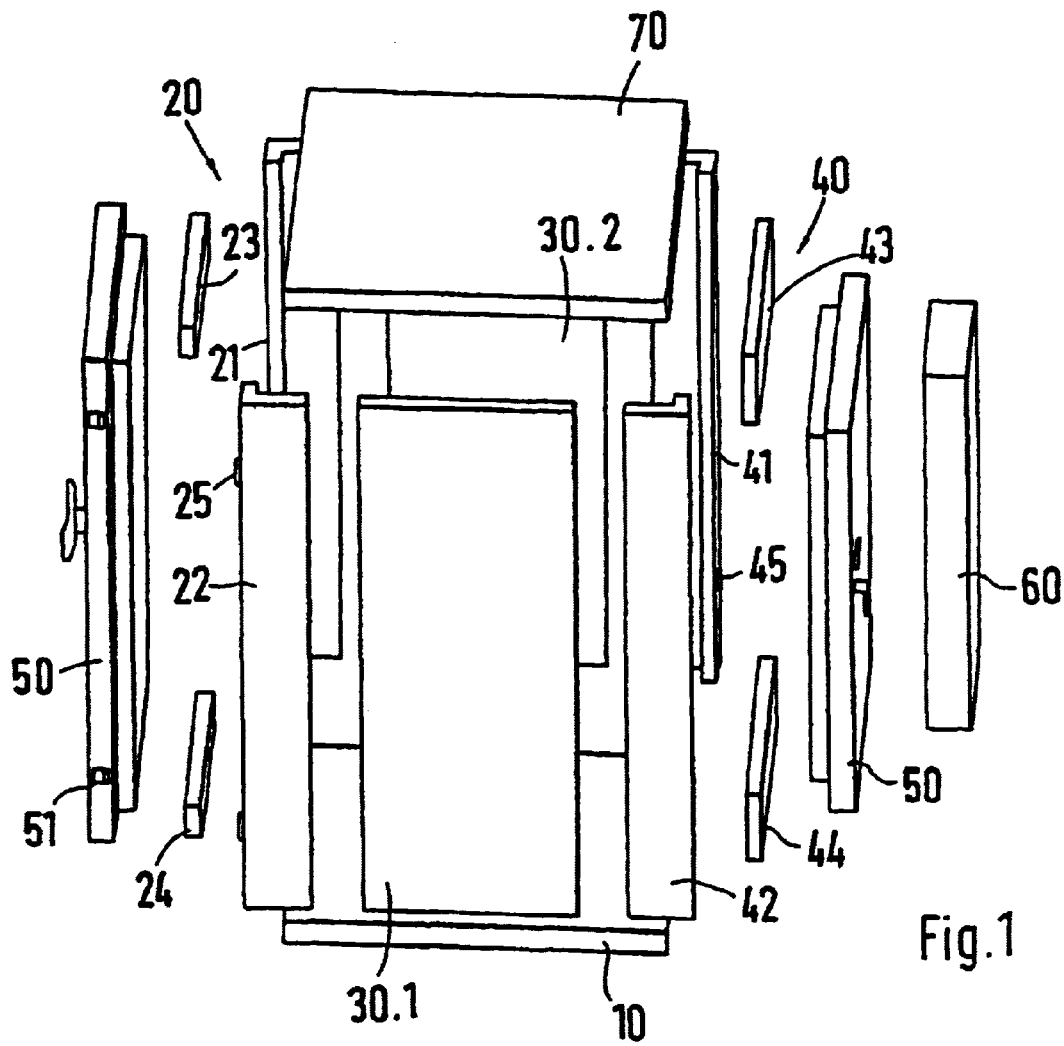
FIG. 1 is a perspective exploded view of elements required for paneling a ready-to-operate connected rack structure.

FIG. 1 shows elements for the structure of a secure cabinet, and for paneling in a closed or a closeable on all sides fashion, of a ready-to-operate rack structure. The kit comprises bottom elements 10 and top elements 70, which are preferably embodied in a panel shape and are identical. The front is closed by means of front grooved elements 20, which are assembled from vertical frame legs 21 and 22 and horizontal frame legs 23 and 24. The vertical frame legs 23 and 24 are L-shaped in cross section, so that narrow front faces are provided on both sides for a connection with adjoining elements. This has one advantage that it is possible to install uniform closure elements in these front faces at all connecting points. A simple alignment of several secure cabinets is possible when omitting intermediate walls.

If the back is also closed by a door element 50, a rear grooved element 40 is used, which has vertical frame legs 41 and 42 and horizontal frame legs 43 and 44 and can receive a door element 50 or a rear wall element 60, for example an air conditioner. The rear wall element 60 can also be directly connected with the side elements 30.1 and 30.2 without a rear grooved element 40. The same as the vertical front faces of the door elements 50, the vertical front faces of the vertical frame legs 21 and 22, or 41 and 42, of the front or rear grooved elements 20 and 40 can have matched hinge and closure elements, as indicated by reference numerals 25, 45 and 51. Because these elements are known for door fastening, they will not be discussed in greater detail within the scope of this invention, and sufficient structural embodiments are available for this purpose.

Figure 2:
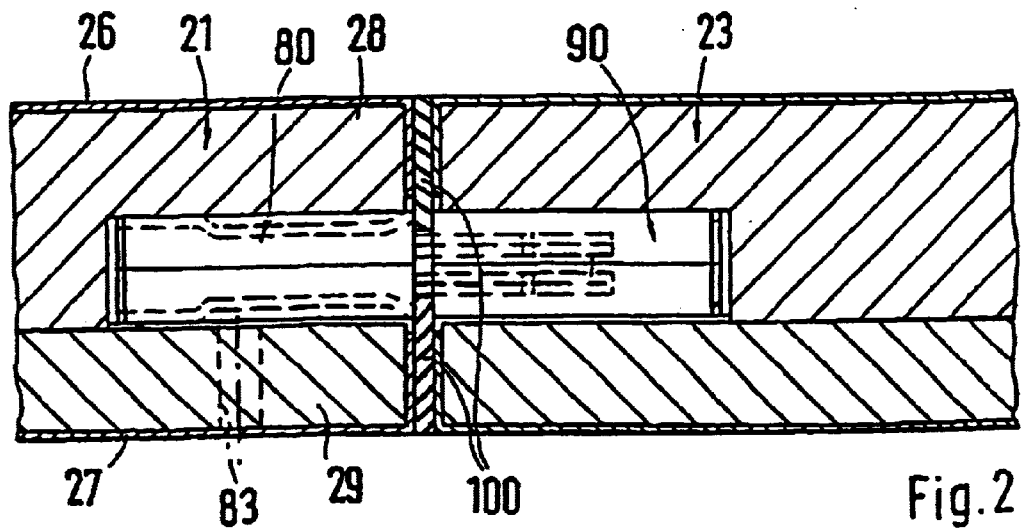
FIG. 2 shows a connecting point between two elements in an enlarged partial sectional view.
Figure 3:
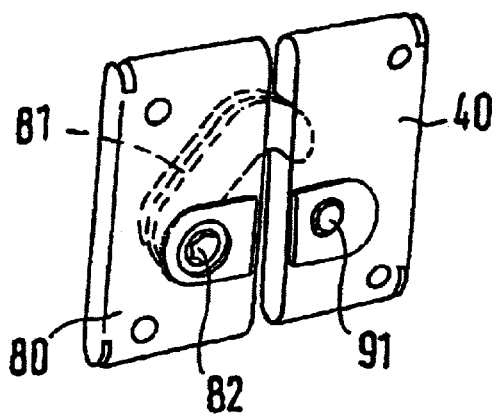
FIG. 3 shows a commercially available turning bar closure in a perspective plan view.

A turning bar closure is preferably used for connecting the elements with each other, as shown in FIG. 2. The sectional view shows a connecting point between the vertical frame leg 21 and the horizontal frame leg 23 of the front grooved element 20. Here, the closure part 80 with a rotatably seated hook 81 is installed in the vertical front face of the frame leg 21, while the matching closure part 90 with the clamping bolt 91 is installed in the vertical front face of the frame leg 23. As FIG. 3 shows, the hook 81 protruding from the frame leg 21 can be inserted into the sleeve-like closure part 90 and, by rotating it can be brought into engagement with the clamping bolt 91. If, in the final phase of rotation the hook 81 is drawn into the closure part 80, which can be effected by means of an eccentric element, the frame legs 21 and 23 are pulled against each other and clamped.

FIG. 2 also makes the double-walled construction of the elements visible. As an example, the frame legs 21 and 23 are enclosed by sheet metal walls 26 and 27, the same as all elements, and are filled with insulating material 28 and 29. The selection of the insulating material is determined by the sound protection, heat protection, fire protection, and other demanded parameters. The joint between the elements connected with each other is thus sealed by a sealing element 100, which must be highly temperature-resistant when used as fire protection.

It is clear that the elements can be connected with each other, above each other along their vertical and/or horizontal front faces, wherein two or more connecting points are selected per element. The connecting elements are each formed by the two closure elements 80 and 90 and are aligned with each other.

Figure 4:
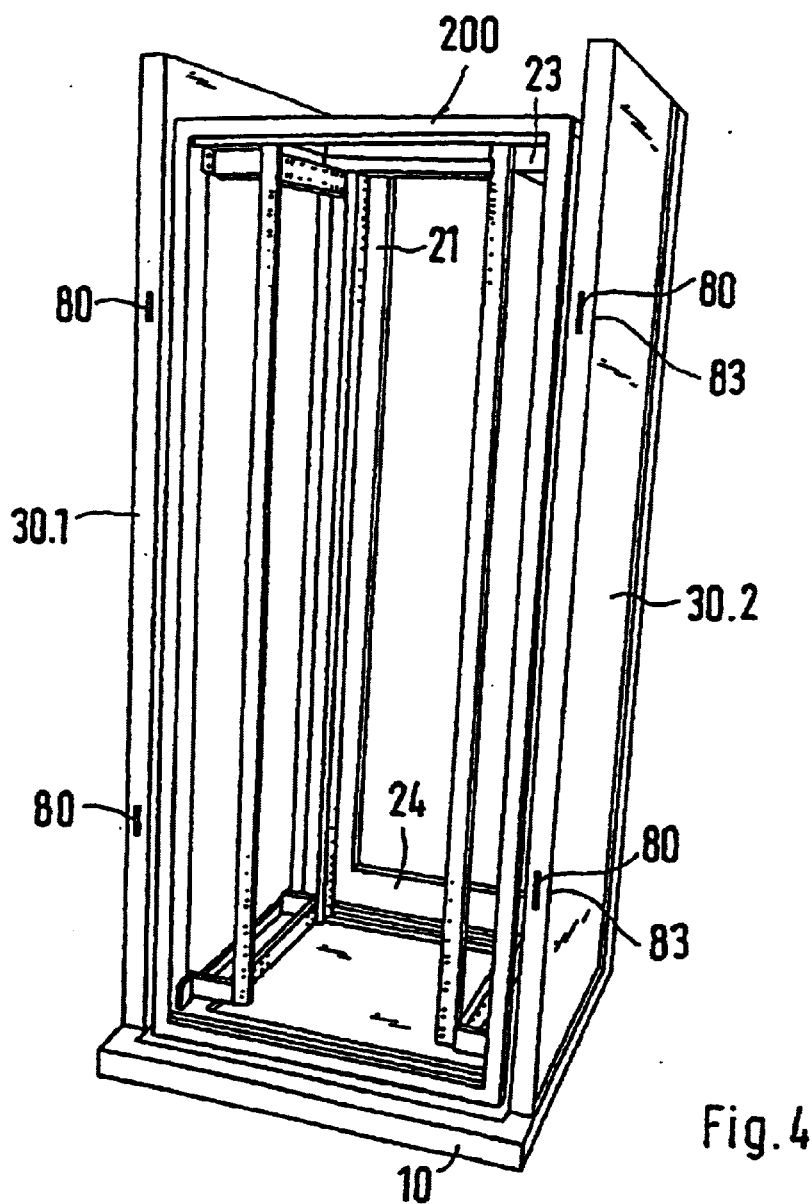
FIG. 4 shows a perspective view of a partially paneled rack structure for explaining the assembly method of this invention.

The method in accordance with this invention is explained in greater detail in view of FIG. 4 wherein, for the sake of simplicity, only the frame structure of the rack structure is represented. Equipping with sub-assemblies can be arbitrarily performed, and the connector cables are preferably inserted through the side walls of the rack structure and connected. Tested, fireproof, water-tight and gas-tight cable bulkhead systems are used.

At the start of the method, the rack structure 200 is raised by a lifting device until a floor element 10 can be slid underneath it. The rack structure 200 is then placed on the floor element 10 beneath it and in the process is positioned so that the bottom element 10 protrudes for the same amount on all sides past the exterior of the rack structure 200.

Then the front grooved element 20, assembled from the frame legs 21, 22, 23 and 24, is placed on the projecting portion of the bottom element 10 in the area of the front of the rack structure 200 and is connected with the bottom element 10. Preferably two turning bar closures as shown in FIG. 3 are installed near the exterior of the lower horizontal frame leg 24 and the facing side of the bottom element 10 wherein, for example, the closure element 90 is inserted in the bottom element 10, and the closure elements 80 are installed in the frame leg 24. The bar shafts 82 are preferably embodied as tool receivers, which are accessible via access openings 83 in the frame leg 24.

Once the front grooved element 20 is connected with the bottom element 10, the panel-shaped side elements 30.1 and 30.2 are placed on the bottom element 10 and connected with the front faces of the free legs of the L-shaped vertical frame legs 21 and 22 of the front grooved element 20 and/or the bottom unit 10. It is thus possible to employ respectively two or more turning bar closures per joint. As shown in FIG. 2, the joints are sealed by sealing elements 100, which have desired properties.

The elements are embodied so that, together with the sealing elements 100, they provide a desired protection, such as heat protection, sound protection, fire protection, protection against splashing water, or the like for the rack structure 200.

The back of the rack element 200 can be covered with a rear grooved element 40, which is assembled from the frame legs 41, 42, 43 and 44, wherein the connections between the frame legs can also have turning bar closures which are installed in the area of the joints and are sealed by means of a seal element 100.

As FIG. 4 shows, the free vertical front faces of the side elements 30.1 and 30.2 have closure elements 80, with bars 81 that can be inserted into closure elements 90 which, with their clamping bolts 91, are installed in the vertical frame legs 41 and 42 of the rear grooved element 40. A door element 50 can also be hinged on the rear grooved element 40. However, a rear wall element 60 can also be inserted into the rear grooved element 40 and connected with the rear grooved element 40. A rear wall element 60 of an appropriate size can also be directly connected with the lateral elements 30.1 and 30.2. It is possible to provide all horizontal and vertical joints with two or more turning bar closures.

At the end, a top element 70 is placed on the grooved elements 20 and 40 and the side elements 30.1 and 30.2 and they are connected with each other and with it in the area of its joint using turning bar closures. In this case the access openings 83 to the rotating shafts 82 of the bars 81 can be accessible from the outside or the inside of the completed paneling.

In one embodiment, the bottom element 10 and the top element 70 are identical. The same also applies to the front grooved element 20 and the rear grooved element 40, and the side elements 30.1 and 30.2 are also identically embodied. Thus the number of different elements required is reduced. Uniform connecting elements, for example known turning bar closures, are employed at all connecting points. Other closures are also conceivable.

A cutout, through which the connector cables are conducted to the rack structure 200, can be provided in the rear grooved element 40 or the rear wall element 60 in the area of the rear of the rack structure 200. The connector cables in the cutout can be sealed by a cable guide, which can be subsequently inserted.

What is claimed is:

1. In a secure cabinet, having a bottom element (10), two side elements (30.1, 30.2), a rear wall element (60), a top element (70) and at least one door element (50), which have seals and complementary connecting elements (80, 90) at connecting points which are aligned with each other, for assembly and disassembly by the user, the improvement comprising:

the bottom element (10), the side elements (30.1, 30.2), the rear wall element (60), the top element (70) and the at least one door element (50) embodied as double-walled and filled with an insulating material (28, 29) as at least one of a noise protection and a fire protection which is enclosed in sheet metal walls (26, 27), and a plurality of joints between the bottom element (10), the side elements (30.1, 30.2), the rear wall element (60) and the top element (70) sealed by a plurality of high temperature-resistant sealing elements (100), and the bottom element (10) having front and rear frame elements (20, 40) which are connected with at least one of the side elements (30.1, 30.2) and the bottom element (10).

2. In the secure cabinet in accordance with claim 1, wherein the connecting elements (80, 90) are turning bar closures (80, 90) and are installed in abutting faces of at least one of the side elements (30.1, 30.2), the rear wall element (60), the bottom element (10) and the top element (70).

3. In the secure cabinet in accordance with claim 2, wherein the bottom element (10) and the top element (70) are identically embodied.

4. In the secure cabinet in accordance with claim 3, wherein the rear wall element (70) comprises a second door element.

5. In the secure cabinet in accordance with claim 4, wherein the front and rear elements (20, 40) are assembled in a frame manner from vertical and horizontal frame legs (21, 22; 41, 42 and 23, 24; 43, 44) and are identically embodied.

6. In the secure cabinet in accordance with claim 5, wherein the vertical frame legs (21, 22) of the front elements (20) have a L-shaped cross section and a leg forming connecting faces for the side elements (30.1, 30.2).

7. In the secure cabinet in accordance with claim 6, wherein the door elements (50) are connected with at least one of the front and the rear elements (20, 40), wherein the vertical frame legs (21, 22; 41, 42) of the elements (20, 40) have hinge and closure elements (25, 41; 51) at connecting points which are aligned with each other.

8. In the secure cabinet in accordance with claim 7, wherein the front and the rear elements (20, 40) are identically embodied.

9. In the secure cabinet in accordance with claim 8, wherein at least one of the frame legs (23, 24, 43, 44) is formed as a fireproof, gas-tight cable bulkhead.

10. In the secure cabinet in accordance with claim 9, wherein side elements (30.1, 30.2) are removable.

11. In the secure cabinet in accordance with claim 10, wherein a rack structure (200) forming an equipped and wired unit is introduced into and connected with the secure cabinet.

12. In the secure cabinet in accordance with claim 1, wherein the bottom element (10) and the top element (70) are identically embodied.

13. In the secure cabinet in accordance with claim 1, wherein the rear wall element (70) comprises a second door element.

14. In the secure cabinet in accordance with claim 1, wherein the front and rear elements (20, 40) are assembled in a frame manner from vertical and horizontal frame legs (21, 22; 41, 42 and 23, 24; 43, 44) and are identically embodied.

15. In the secure cabinet in accordance with claim 1, wherein vertical frame legs (21, 22) of the front elements (20) have a L-shaped cross section and a leg forming connecting faces for the side elements (30.1, 30.2).

16. In a secure cabinet, having a bottom element (10), two side elements (30.1, 30.2), a rear wall element (60), a top element (70) and at least one door element (50), which have seals and complementary connecting elements (80, 90) at connecting points which are aligned with each other, for assembly and disassembly by the user, the improvement comprising:

the bottom element (10), the side elements (30.1, 30.2), the rear wall element (60), the top element (70) and the at least one door element (50) embodied as double-walled and filled with an insulating material (28, 29) as at least one of a noise protection and a fire protection which is enclosed in sheet metal walls (26, 27), and a plurality of joints between the bottom element (10), the side elements (30.1, 30.2), the rear wall element (60) and the top element (70) sealed by a plurality of high temperature-resistant sealing elements (100), the at least one door element (50) connected with at least one of front and rear frame elements (20, 40), and vertical frame legs (21, 22; 41, 42) of the front and rear frame elements (20, 40) having hinge and closure elements (25, 41; 51) at connecting points which are aligned with each other.

17. In the secure cabinet in accordance with claim 16, wherein front and rear elements (20, 40) are identically embodied.

18. In a secure cabinet, having a bottom element (10), two side elements (30.1, 30.2), a rear wall element (60), a top element (70) and at least one door element (50), which have seals and complementary connecting elements (80, 90) at connecting points which are aligned with each other, for assembly and disassembly by the user, the improvement comprising:

the bottom element (10), the side elements (30.1, 30.2), the rear wall element (60), the top element (70) and the at least one door element (50) embodied as double-walled and filled with an insulating material (28, 29) as at least one of a noise protection and a fire protection which is enclosed in sheet metal walls (26, 27), and a plurality of joints between the bottom element (10), the side elements (30.1, 30.2), the rear wall element (60) and the top element (70) sealed by a plurality of high temperature-resistant sealing elements (100), and front and rear frame elements (20, 40) are connected with at least one of the side elements (30.1, 30.2) and bottom element (10), the frame elements are assembled in a frame manner from vertical and horizontal frame legs (23,24,43,44) at least one of the frame legs (23, 24, 43, 44) is formed as a fireproof, gas-tight cable bulkhead.

19. In the secure cabinet in accordance with claim 18, wherein the side elements (30.1, 30.2) are removable.

20. In the secure cabinet in accordance with claim 18, wherein a rack structure (200) forming an equipped and wired unit is introduced into and connected with the secure cabinet.

* * * * *